United States Patent
Hedrick et al.

(10) Patent No.: US 9,059,573 B2
(45) Date of Patent: Jun. 16, 2015

(54) CUTTING, STRIPPING AND CRIMPING ALL-IN-ONE TOOL

(75) Inventors: Kyle Dean Hedrick, Midlothian, VA (US); Michael Stephens, Glen Allen, VA (US)

(73) Assignee: TEXTRON INNOVATIONS INC., Providence, RI (US)

( * ) Notice: Subject to any disclaimer, the term of this patent is extended or adjusted under 35 U.S.C. 154(b) by 537 days.

(21) Appl. No.: 13/372,961

(22) Filed: Feb. 14, 2012

(65) Prior Publication Data

US 2012/0204413 A1 Aug. 16, 2012

Related U.S. Application Data

(60) Provisional application No. 61/442,512, filed on Feb. 14, 2011.

(51) Int. Cl.
| | | |
|---|---|---|
| *B23P 11/00* | (2006.01) | |
| *H02G 1/00* | (2006.01) | |
| *H01R 43/042* | (2006.01) | |
| *H02G 1/12* | (2006.01) | |
| *B25F 1/00* | (2006.01) | |

(52) U.S. Cl.
CPC .............. *H02G 1/005* (2013.01); *Y10T 29/5151* (2015.01); *H01R 43/0421* (2013.01); *H02G 1/1224* (2013.01); *B25F 1/003* (2013.01)

(58) Field of Classification Search
CPC ........ B25B 9/00; B25B 27/00; B25B 27/0035
USPC ............. 29/268, 261, 267, 278, 270; 81/9.42; 269/3, 6, 95
See application file for complete search history.

(56) References Cited

U.S. PATENT DOCUMENTS

| | | | | |
|---|---|---|---|---|
| 3,824,669 | A * | 7/1974 | Hilton | 29/56.6 |
| 4,162,638 | A * | 7/1979 | McCord | 30/90.1 |
| 5,009,006 | A * | 4/1991 | Sawyer et al. | 30/90.6 |
| 5,062,192 | A * | 11/1991 | Sawyer et al. | 29/426.4 |
| 6,618,885 | B1 * | 9/2003 | Blaustein | 7/107 |
| 7,900,537 | B2 * | 3/2011 | Hanning et al. | 81/9.43 |
| 2002/0004984 | A1 * | 1/2002 | Murg | 29/867 |
| 2003/0014867 | A1 * | 1/2003 | Lawler | 30/90.1 |
| 2009/0049696 | A1 * | 2/2009 | Pisczak et al. | 30/91.2 |
| 2010/0313428 | A1 * | 12/2010 | Mocanu | 30/193 |
| 2012/0204413 | A1 * | 8/2012 | Hedrick et al. | 29/566.4 |

* cited by examiner

*Primary Examiner* — Lee D Wilson
(74) *Attorney, Agent, or Firm* — Klintworth & Rozenblat IP LLC (57) ABSTRACT

A tool includes lower and upper members which are connected together so that the tool can be moved to an open position or to a closed position. The tool has a number of cutting blades and surfaces which allow a user to cut or strip a HDMI cable. The tool also has a pair of platforms which hold an associated laced wire guide and mated terminal block therein. The tool can be used to terminate the cut and stripped HDMI cable with the mated wire guides and terminal block.

20 Claims, 9 Drawing Sheets

CUTTING, STRIPPING AND CRIMPING ALL-IN-ONE TOOL

This application claims the benefit of U.S. provisional application Ser. No. 61/442,512 filed on Feb. 14, 2011, the disclosure of which is herein incorporated by reference in its entirety.

FIELD OF THE INVENTION

The present invention relates to a tool for receiving, holding and aligning individual HDFT connector components, including laced wire guides and a terminal block, and crimping the terminal block onto the wires in the wire guides. The tool is capable of cutting, stripping and crimping the wires such that an all-in-one tool is provided.

BACKGROUND OF THE INVENTION

High Definition Media Interface (HDMI) cables contain nineteen wires that must be terminated to a connector at each end. Prior art termination methods include Insulation Displacement Contacts (IDC), wave form soldering and hand soldering. Because of the relatively high number of wires and the compact form of the connector, terminations of HDMI cables historically have been done in a factory setting to maintain necessary control and consistency to ensure quality of the connection.

Recently, at least one cable manufacturer has developed a connector design and method which enables field terminating HDMI cables (HDFT), while preserving the necessary quality of the connection. In this connector design, the connector includes a terminal block with Insulation Displacement Contacts (IDC) and a male connector portion, two unique wire guides for containing individual wires in position to be aligned with the IDC for termination, and two outer housing components.

The HDMI cable is terminated by first cutting the HDMI cable to desired length. A predetermined length of the outer jacket of the HDMI cable is then stripped from both ends of the cable. Preferably, approximately 1.5" to 2.0" of the outer HDMI cable is stripped from each end. The exposed braided shielding and foil are trimmed from the stripped ends. The foil shielding is then removed from the twisted pairs of wires in the HDMI cable. After being separated, the individual wires are laced into designated holes of wire guides. Thereafter, approximately 0.5" to 1.0" of the wires are trimmed from outside of the wire guide. The laced wire guides are positioned onto corresponding locations of terminal block and the laced wire guides are compressed towards the terminal block a sufficient amount to cause the contacts in the terminal block to pierce the insulation surrounding the conductors in the wires and to engage the individual conductors (crimping or termination process). The ground wire is attached to the outer housing and secured with a strain relief. The outer housing is assembled to a terminated connector.

The connector design and method described above vastly improves the capability for field terminating HDMI cables. The small size of the individual components, the number of wires to be terminated and the relative precision required can cause numerous issues for technicians using conventional tools; such as cable cutters, wire strippers, razor blades, wire cutters and compression tool (i.e., pliers, crimper, etc.); and such issues can be exacerbated with larger-sized tools which hamper precision operation.

One solution which has been developed by tool manufacturers is to use a temporary load fixture to help position the laced wire guides with the terminal block and hold in place during the crimping process, then remove the fixture after termination. This requires an additional component to handle and extra steps.

As each component and each step invites an opportunity for error and adds time to the process, this method is suboptimal. This is particularly true for professional technicians who may make multiple terminations for one job; resulting in increased time and possibilities for errors.

The present invention provides a tool which provides a more effective and user-friendly solution to yield consistent and quality connections and which overcomes the disadvantages presented by the prior art. Other features and advantages will become apparent upon a reading of the attached specification, in combination with a study of the drawings.

SUMMARY OF THE INVENTION

An all-in-one tool which is capable of cutting, stripping and crimping for field terminating HDMI wires is provided. The tool receives, holds and aligns individual HDFT connector components, including laced wire guides and a terminal block, and crimps the terminal block onto the wires in the wire guides. The tool includes lower and upper members which are connected together so that the tool can be moved to an open position or to a closed position. The tool has a number of cutting blades and surfaces which allow a user to cut or strip the HDMI cable. The tool also has a pair of platforms which hold the laced wire guides and mated terminal block therein. The tool can be used to terminate the cut and stripped HDMI cable with the mated wire guides and terminal block.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENTS

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

Figure 1:
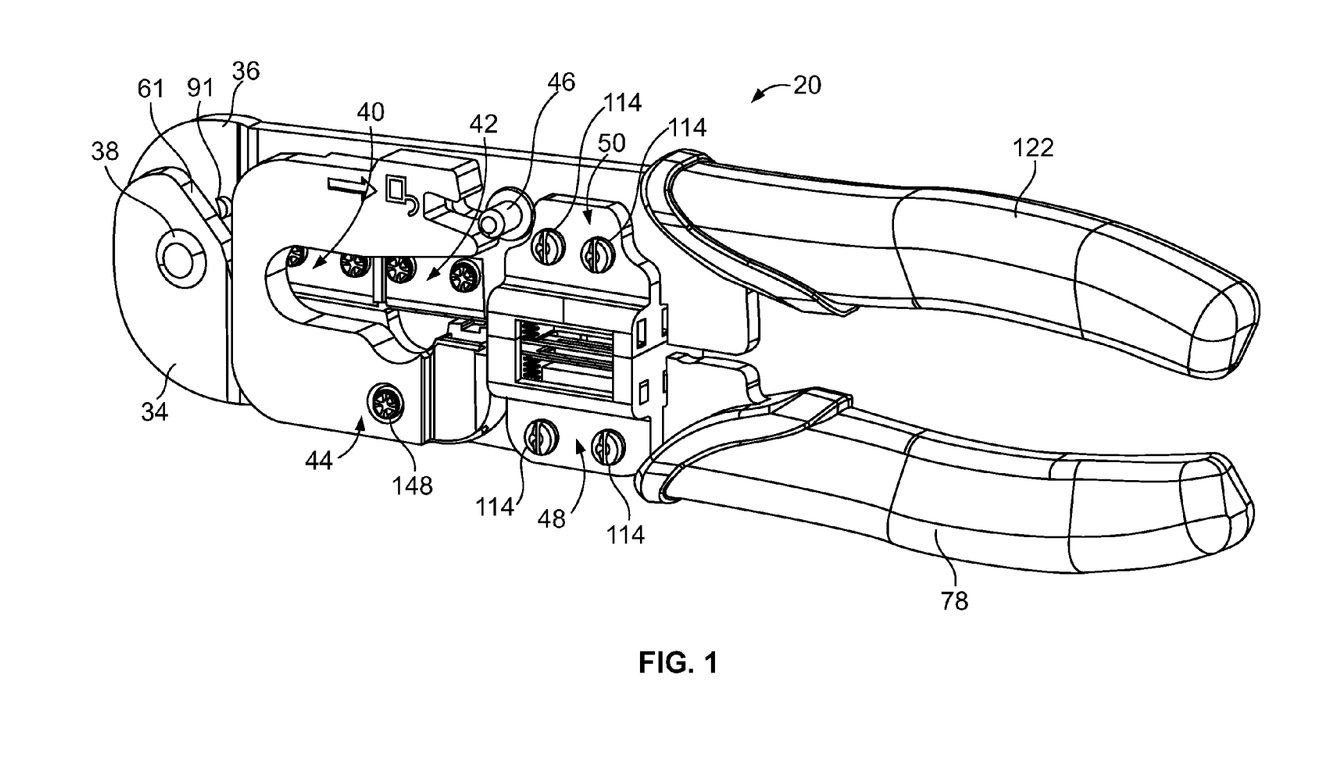
FIG. 1 is an perspective view of a cutting, stripping and crimping all-in-one tool which incorporates the features of the present invention.

FIG. 1 shows a preferred embodiment of a tool 20 which incorporates features of the present invention. The tool 20 is used to connect and terminate the wires laced into a pair of wire guides 400, 402 with a terminal block 404, see FIG. 15. The tool 20 provides a user with the ability to cut, strip and crimp wires, thereby providing an extremely versatile all-in-one tool.

Figure 2:
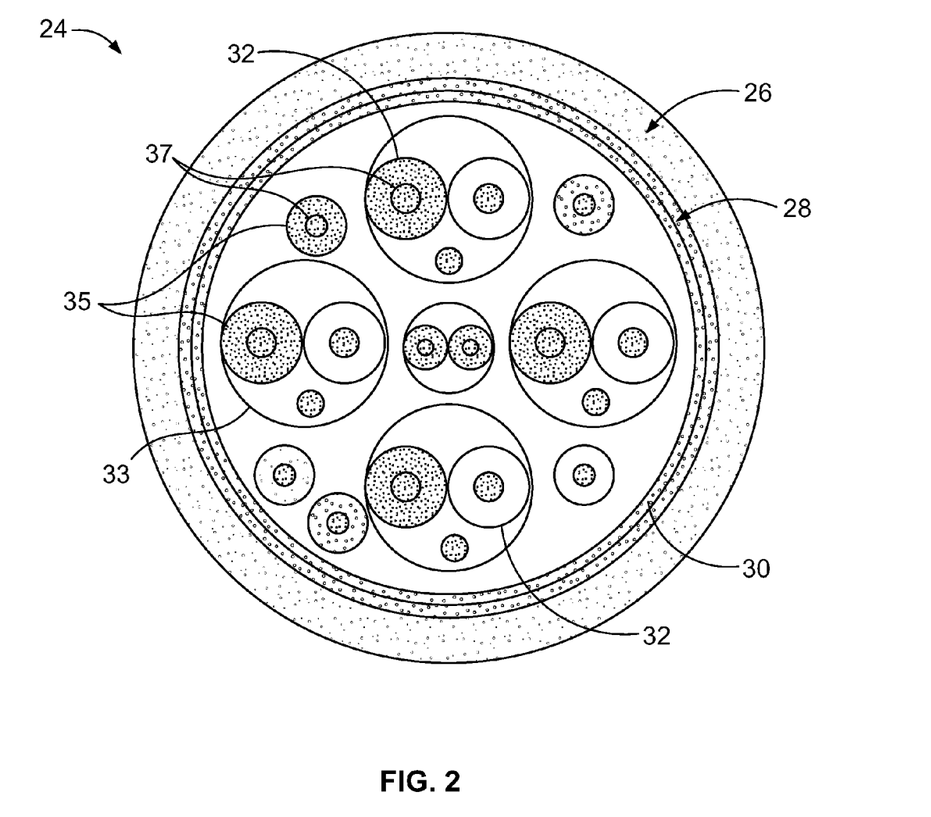
FIG. 2 is a cross-sectional view of a wire.

HDMI cable 24, FIG. 2, is known in the industry. HDMI cable 24 is a bundle of wires (nineteen wires) which are used to deliver high definition images and audio to electronics. An example of HDMI cable 24 is shown in FIG. 2. As shown, the HDMI cable 24 includes an outer jacket 26, a braided wire shield 28, and foil 30 which surrounds the wires 32. The outer jacket 26 is preferably constructed of a pliable plastic such as PVC that is easily cut by a sharp blade. The outer jacket 26 has a thickness which allows it to be easily cut through without damaging the wires 32. The wires 32 includes four or five twisted pairs with the remaining being discrete wires 32. Each twisted pair of wires 32 has a foil shield 33 surrounding a pair of wires 32. Each wire 32 has an outer insulative covering 35 surrounding a conductor 37. The outer insulative covering 35 insulates the conductor 37 and prevent electrical shorts and accidental electrical shock. Preferably, each wire 32 has a circular cross-section. The conductors 37 in the wires 32 are exposed using the tool 20 and thereafter are laced into wire guides 400, 402 in a manner known in the art. The tool 20 is used to crimp the wire guides 400, 402 together with the terminal block 404.

As shown, the tool 20 includes a lower member 34 and an upper member 36 which are connected together by a pivot pin 38. The terms lower, upper and the like are used for ease in description of the tool 20 and do not denote a required orientation during use of the tool 20. A pair of cutting blades 40, 42 are connected to the upper member 36. A guard and locking member 44 is connected to the lower member 34 and is capable of engaging with a movable pin 46 mounted on the upper member 36. A lower crimping and cutting assembly 48 is mounted on the lower member 34 and an upper crimping and cutting assembly 50 is mounted on the upper member 50. The assemblies 48, 50 are used to terminate the wires 32 in the HDMI cable 24 into the terminal block 404 as described herein.

Figure 3:
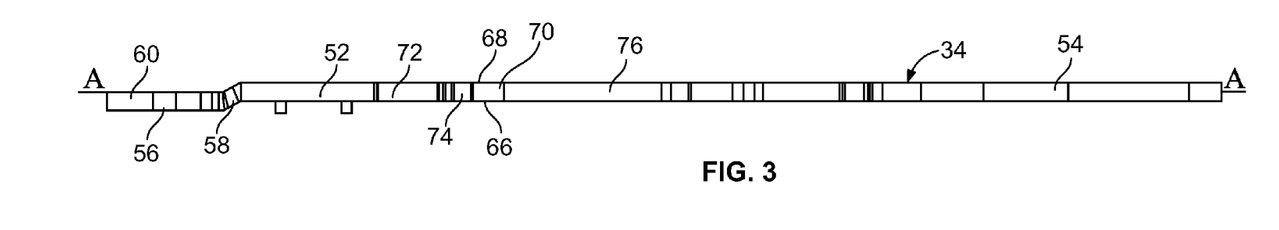
FIG. 3 is an top plan view of a lower member of the tool.
Figure 4:
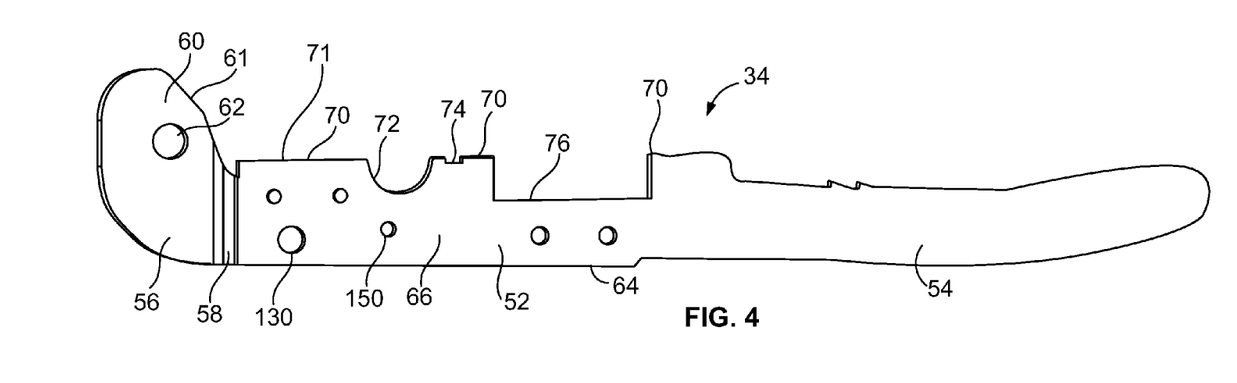
FIG. 4 is a side elevational view of the lower member of FIG. 3.

The lower member 34 is best illustrated in FIGS. 3 and 4. The lower member 34 has a body 52 which has a curved handle 54 provided at a proximal end thereof, and a head 56 provided at a distal end thereof. The body 52 and the handle 54 are elongated and aligned along centerline A-A. The head 56 has an angled section 58 connected to the distal end of the body 52 and which angles outwardly from centerline A-A, and an enlarged section 60 provided at the opposite end of the angled section 58. The enlarged section 60 is parallel to the body 52 and handle 54. One side surface of the enlarged section 60 falls on the centerline A-A.

The body 52 has a lower edge 64 which is substantially planar, a first planar side surface 66, a second planar side surface 68 and a planar upper edge 70 which has a plurality of recesses 72, 74, 76 extending downwardly therefrom. The upper edge 70 includes an elongated section 71 extending from the distal end of the body 52 a predetermined distance. A semi-circular recess 72 extends from the proximal end of the elongated section 71, a small rectangular recess 74 is spaced from the semi-circular recess 72 by a section of the upper edge, and a large rectangular recess 76 is spaced from the small rectangular recess 74 by a section of the upper edge 70. The small rectangular recess 74 has dimensions which are significantly smaller than the semi-circular recess 72.

A hand grip 78, FIG. 1, is suitably attached to the handle 54 of the lower member 34 by suitable means. The hand grip 78 has an ergonomic shape to enable a user to comfortably position his/her hand thereon. The hand grip 78 is preferably formed of rubber or has a rubber coating thereon so that the user's hand does not slide on the lower member 54 during use.

The enlarged section 60 has parallel side surfaces and an upper edge 61 which is curved and extends upwardly from the upper edge 70. The enlarged section 60 mates with the upper member 36. An aperture 62 is provided through the enlarged section 60.

Figure 5:
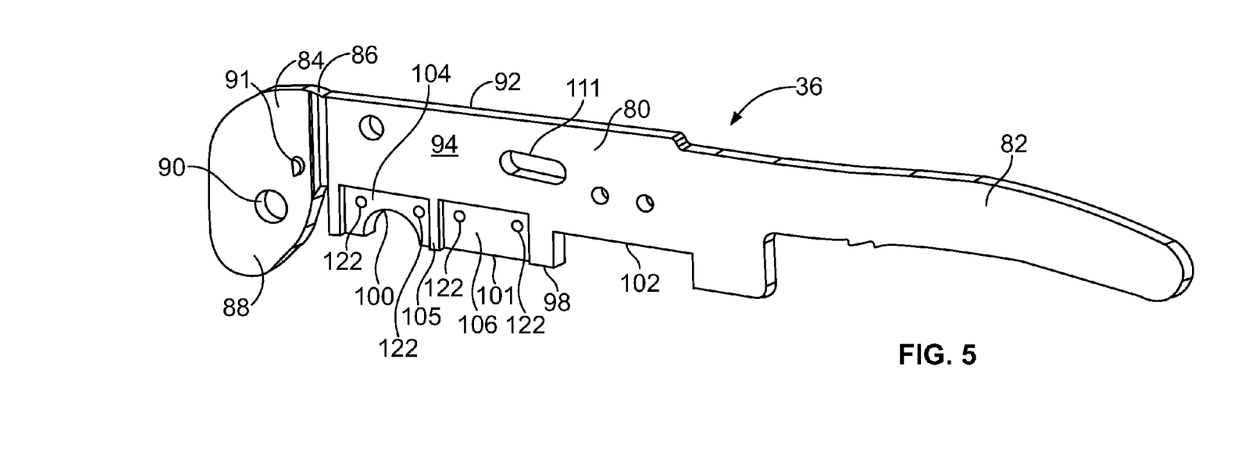
FIG. 5 is a perspective view of an upper member of the tool.
Figure 6:
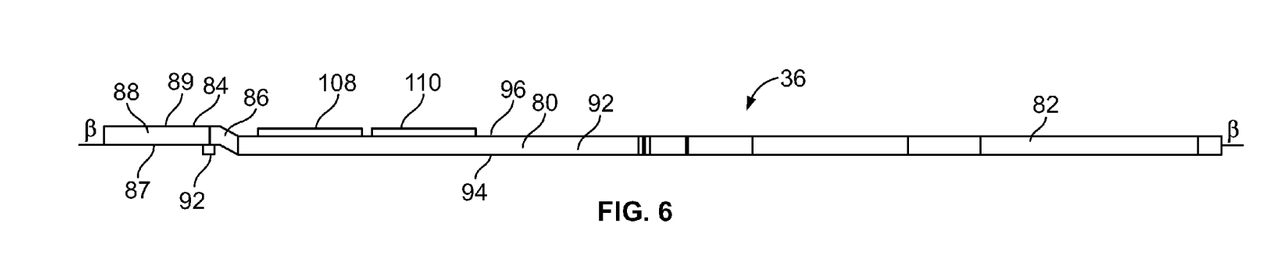
FIG. 6 is a bottom plan view of the lower member of FIG. 5.

The upper member 36 is best illustrated in FIGS. 5 and 6. The upper member 36 has a body 80 which has a curved handle 82 provided at a proximal end thereof, and a head 84 provided at a distal end thereof. The body 80 and handle 82 are elongated and aligned along centerline B-B (also centerlines A-A and B-B align with each other when the lower and upper members 34, 36 are mated together). The head 84 has an angled section 86 connected to the distal end of the body 80 and which angles outwardly from centerline B-B, and an enlarged section 88 provided at the opposite end of the angled section 86.

The enlarged section 88 is parallel to the body 80 and handle 82. The enlarged section 88 has parallel side surfaces 87, 89. Side surface 87 falls on the centerline B-B; side surface 89 is offset from the centerline B-B. An aperture 90 is provided through the enlarged section 88. A protrusion 91 extends outwardly from side surface 87. The protrusion 91 is above the aperture 90 and is proximate to the angled section 86.

The body 80 has an upper edge 92, a first side surface 94, a second side surface 96 and a planar lower edge 98 which has a pair of recesses 100, 102 extending upwardly therefrom. Recess 100 is separated from recess 102 by an elongated section 101 of the lower edge 98. Recess 100 is semi-circular recess; recess 102 is large and rectangular. Side surface 94 includes a pair of recesses 104, 106. Recess 104 is provided in side surface 94 and has the semi-circular recess 100 extending upwardly from its lower edge. Recess 106 is provided in side surface 94 and is spaced from recess 104 by a section 105 of the body 80. Recess 106 is provided between recess 104 and recess 102. A portion of the elongated section 101 forms the lower edge of the recess 106. The walls which define the recesses 104, 106 form respective offset portions 108, 110 in surface 96.

An elongated, oval-shaped slot 111 is provided through the body 80. The slot 111 is proximate to, but spaced above, the recess 106. The slot 111 generally extends a predetermined distance along the length of the body 80, and slants upwardly from its proximal end to its distal end. The pin 46 is positioned within and can slide freely within the oval-shaped slot 111.

Figure 7:
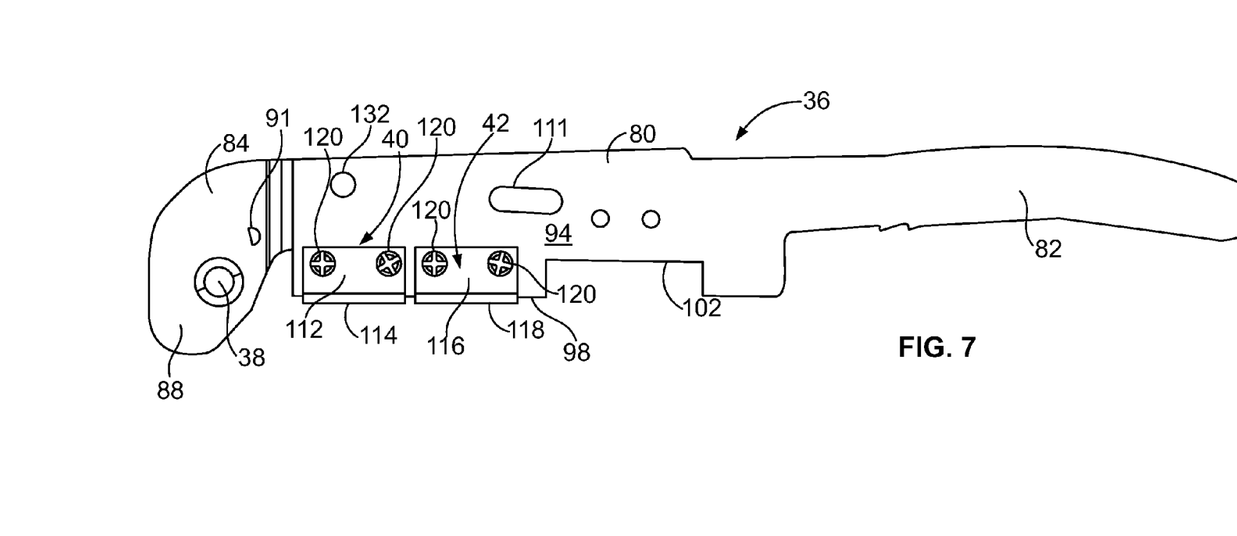
FIG. 7 is a side elevational view of the bottom member shown with cutting blades attached thereto.

As shown in FIG. 7, blade 40 has a body portion 112 positioned within the recess 104 and a cutting edge 114 which extends downwardly from the lower edge 98 of the body 80. The cutting edge 114 extends axially along the upper member 36. The body portion 112 is recessed from the remainder of the side surface 94 as a result of its positioning within recess 104. Blade 42 has a body portion 116 positioned within the recess 106 and a cutting edge 118 which extends downwardly from the lower edge 98 of the body 80. The cutting edge 118 extends axially along the upper member 36. The body portion 116 is recessed from the remainder of the side surface 94 as a result of its positioning within recess 106. The cutting edges 114, 118 of the blades 40, 42 are parallel with the centerline A-A/B-B of the tool 20. The blades 40, 42 are attached to the upper member 36 by suitable means, such as fasteners 120, which extend through apertures 122 provided through the body 80 in the recesses 104, 106.

A hand grip 122, FIG. 1, is suitably attached to the handle 82 of the upper member 36 by suitable means. The hand grip 122 has an ergonomic shape to enable a user to comfortably position his/her hand thereon. The hand grip 122 is preferably formed of rubber or has a rubber coating thereon so that the user's hand does not slide on the upper member 36 during use.

The enlarged section 88 of the head 84 extends downwardly from the lower edge 98. The enlarged section 88 of the upper member 26 mates with the enlarged section 60 of the lower member 34. When mated, the apertures 62, 90 align with each other. The protrusion 91 is capable of engaging against the upper edge 61 of the enlarged section 60 to limit the opening of the tool 20. The body 52 of the lower member 34 is planar with the body 80 of the upper member 36 (i.e. the centerlines A-A and B-B align). The pivot pin 38 is secured through the aligned apertures 62, 90 in the mated enlarged sections 60, 88 which allows the lower and upper members 34, 36 to pivot relative to each other. When the upper and lower members 34, 36 are in a closed position (the handles 54, 82 are close to each other), the elongated section 71 of the lower member 34 is adjacent to the semi-circular recess 100 of the upper member 36 such that the blade 40 is adjacent to the elongated section 71, the semi-circular recess 72 and the small rectangular recess 74 of the lower member 34 are adjacent to the elongated section 101 of the upper member 36 such that the blade 42 is adjacent to the semi-circular recess 72 and the small rectangular recess 74, and the large rectangular recesses 76, 102 on the lower and upper members 34, 36 are adjacent to each other. The cutting edges 114, 118 of the blades 40, 42 fall along the midpoint of the upper edge 70 of the lower member 34.

Figure 8:
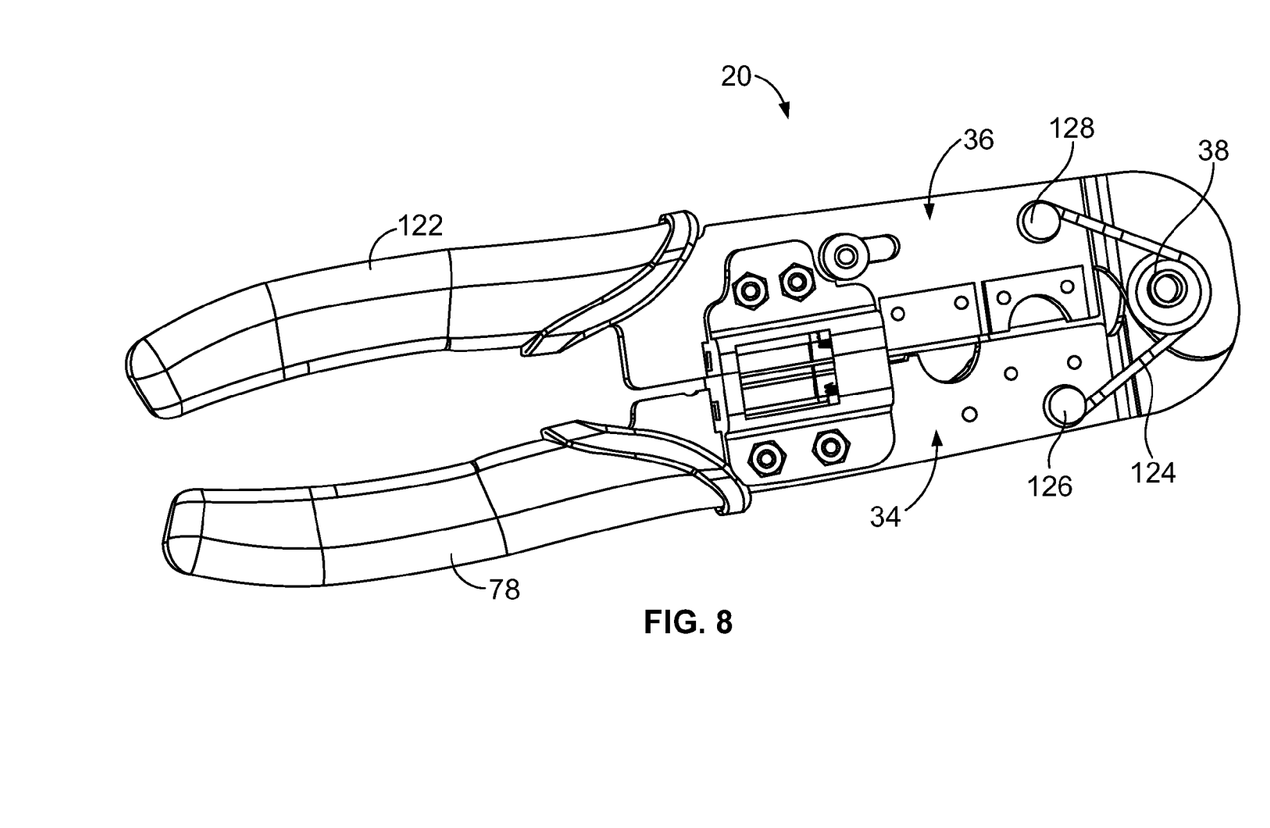
FIG. 8 is an alternate perspective view of the all-in-one tool.

As shown in FIG. 8, a spring 124 has ends attached to pins 126, 128 and a middle section which encircles the pivot pin 38. Pin 126 extends through an aperture 130 in lower member 34 and pin 128 extends through an aperture 132 in upper member 36. The spring 124 acts to bias the lower and upper members 34, 36 into the open position (i.e., the handles 54, 82 are moved apart from each other). The engagement of the curved edge 61 with the protrusion 91 limits the amount of travel when the tool 20 is opened.

Figure 9:
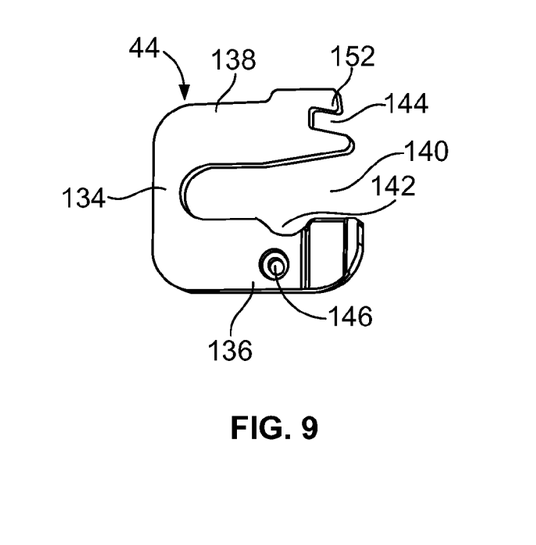
FIG. 9 is a perspective view of a guard and locking member which forms a component of the tool.

The guard and locking member 44, see FIGS. 1 and 9, is connected to the lower member 34 and is capable of engaging with the moveable pin 46 on the upper member 36. The guard and locking member 44 is generally C-shaped and has a vertical base wall 134, a lower wall 136 extending from the lower end of the base wall 134, and an upper wall 138 extending from the upper end of the base wall 134 which defines a central slot 140 which extends parallel to the walls 136, 138. The upper edge of the lower wall 136 has a semi-circular recess 142 which mirrors the shape of semi-circular recess 72 in the lower member 34. A slot 144 is provided in the upper wall 138 and extends from the free end of the upper wall 138 upwardly and rearwardly toward the base wall 134. An aperture 146 is provided through the lower wall 136 proximate to, but spaced from, the recess 142.

The guard and locking member 44 is mounted to the side surface 66 of the body 52 of the lower member 34 by a fastener 148, FIG. 1, which also extends through an aperture 150, FIG. 4, in the lower member 34. As a result, the guard and locking member 44 is fixed to the lower member 34, but is movable relative to the upper member 36. When the members 34, 36 are in the closed position (the handles 54, 82 are brought proximate to each other), the guard and locking member 44 is positioned such that the side surface of the upper wall 138 abuts against the side surface 94 of the body 80 of the upper member 36 as shown in FIG. 1. The slot 144 in the upper wall 138 aligns with a portion of the slot 111 on the upper member 36. As a result, the pin 46 in the slot 111 can be moved into the slot 144 on the guard and locking member 44, or can be moved to be positioned outside of the slot 144 on the guard and locking member 44. When the pin 46 is moved into the slot 144, an enlargement 152 at the end of the slot 144 of the upper wall 138 prevents the easy removal of the pin 46 from the slot 144. The pin 46 can be removed from the slot 144 when sufficient force is applied to the pin 46 to move it past the enlargement 152. As an alternative to the enlargement 152, the slot 144 can be angled such that when the pin 46 is inserted therein, the pin 46 becomes lodged therein by a friction fit.

As best shown in FIGS. 10-14, each of the lower crimping and cutting assembly 48 and the upper crimping and cutting assembly 50 is formed from a platform 154a, 154b having a blade 156a, 156b mounted thereon and having a spring assembly 158a, 158b mounted thereon. The platforms 154a, 154b are identical with the exceptions noted herein. The blades 156a, 156b and spring assemblies 158a, 158b are identical.

Figure 11:
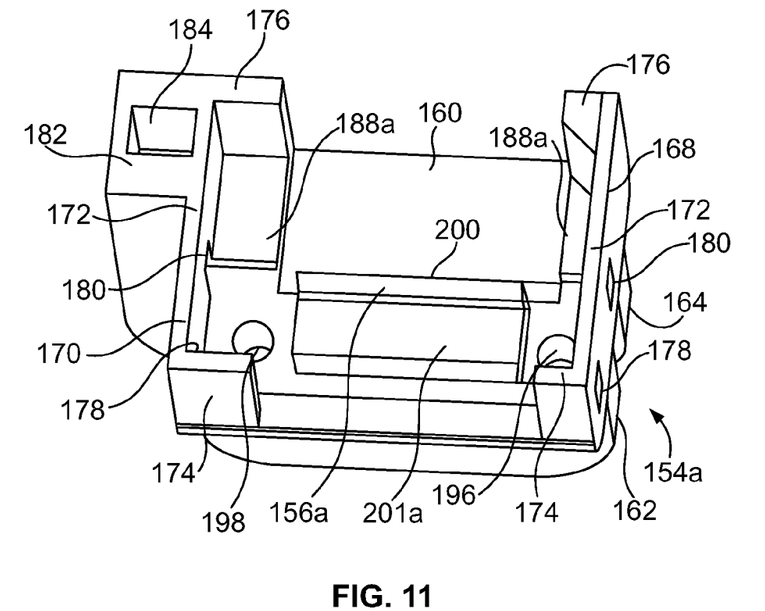
FIG. 11 is a perspective view of a platform which forms part of the lower crimping and cutting assembly.
Figure 12:
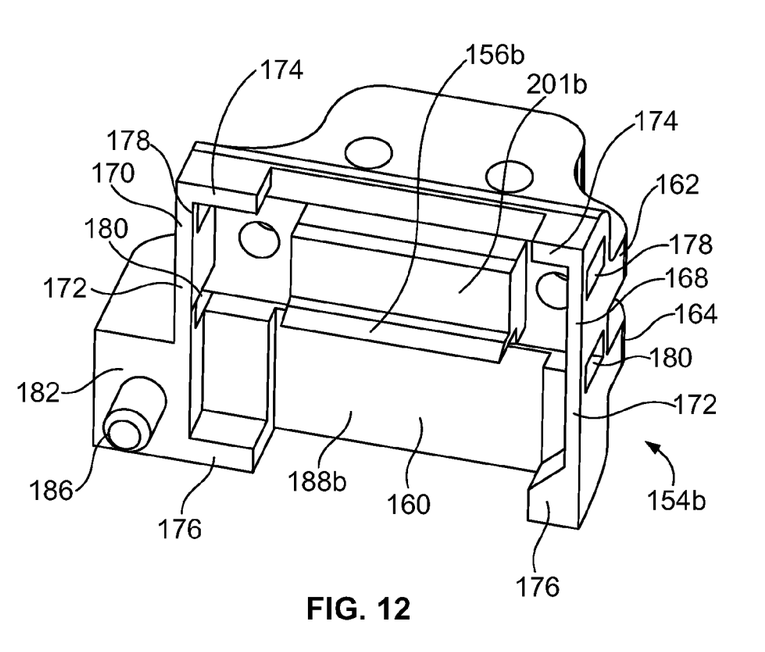
FIG. 12 is a perspective view of a platform which forms part of the upper crimping and cutting assembly.

Each platform 154a, 154b includes a generally rectangular base 160 which has a pair of spaced apart legs 162, 164 extending from a lower surface thereof and a pair of spaced apart arms 168, 170 extending from an upper surface thereof. The legs 162, 164 extend perpendicularly to the base 160 and generally extend from a proximal end of the base 160 to a distal end of the base 160. The legs 162, 164 are spaced apart from each other to define a gap which is equal to the width of the body 52, 80 of the lower/upper members 34, 36. The arms 168, 170 extend from the proximal and distal ends of the base 160. Each arm 168, 170 is generally C-shaped and has a base wall 172 and opposite side walls 174, 176 which extend from the base wall 172. The walls 172, 174, 176 extend perpendicularly to the base 160. The base walls 172 are perpendicular to the legs 162, 164 and the side walls are parallel to the legs 162, 164. A pair of spaced apart rectangular slots 178, 180 are provided through each of the base walls 172. Slot 180 in each base wall 172 is provided along the centerline of the platform 154a, 154b and thus is positioned above the gap between the legs 162, 164. Slots 180 are aligned in each platform 154a, 154b. Slot 178 in each base wall 172 is provided at the junction with the side wall 174. Slots 178 are aligned with each other and are offset from the centerline of the platform 154a, 154b. The arms 168, 170 define a cavity which substantially mirrors the shape of the shield 424 of the terminal block 404.

An extension 182 extends distally from the distal end of the base 160. In one of the crimping and cutting assemblies, shown as lower crimping and cutting assembly 48, a recess 184 is provided, and in the other of the crimping and cutting assemblies, shown as upper crimping and cutting assembly 50, a pin 186 extends from the extension 182 in a direction opposite to the base 160. It is to be understood that the recess 184 could be provided in the upper crimping and cutting assembly 50 and the pin 186 can be provided with the lower crimping and cutting assembly 48. The recess 184 and the pin 186 are used to properly align the lower and upper crimping and cutting assemblies 48, 50 and it is within the scope of the invention that other means for properly aligning the assemblies 48, 50 can be provided.

The surface of the base 160 between the arms 168, 170 has a pair of terminal block mounts 188a, 188b provided on one side thereof, and the blade 156a, 156b and the spring assembly 158a, 158b are provided on the other side of the base 160 between the arms 168, 170. The terminal block mounts 188a, 188b extend upwardly from the base 160.

The blade 156a, 156b extends perpendicularly from the surface of the respective base 160 between the arms 168, 170 and extends perpendicularly to base wall 172 of each arm 168, 170. Each blade 156a, 156b extends proximally and distally and thus is parallel to the legs 162, 164. Each blade 156a, 156b is offset from the centerline of the base 160. Each blade 156a, 156b has a cutting edge 200 at its free end. A push block 201a, 201b is provided on the surface of the platform 154a, 154b proximate to the blade 156a, 156b. The push block 201a, 201b extends upwardly from the platform 154a, 154b and is provided on the opposite side of the blade 156a, 156b to that which the terminal block mount 188a, 188b is provided. The push block 201a, 201b is generally rectangular.

Each spring assembly 158a, 158b includes a pair of coil springs 192 (only one of which is shown in each spring assembly 158a, 158b) and a flat spring 195. A recess 196, 198 is provided in the surface of the platform 154a, 154b at both ends of each blade 156a, 156b and the coil springs 192 are mounted within respective recesses 196, 198. The flat springs 195 are respectively attached to the lower and upper crimping and cutting assemblies 48 and seats on the pair of coil springs 192 provided in each of the lower and upper crimping and cutting assemblies 48 as discussed herein.

Figure 13:
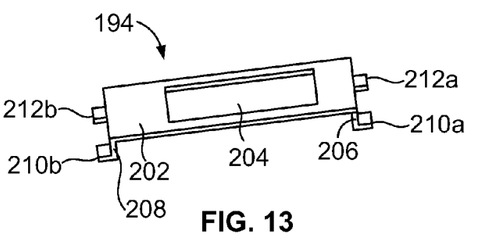
FIG. 13 is a perspective view of a flat spring which forms part of the lower and upper crimping and cutting assemblies.
Figure 14:
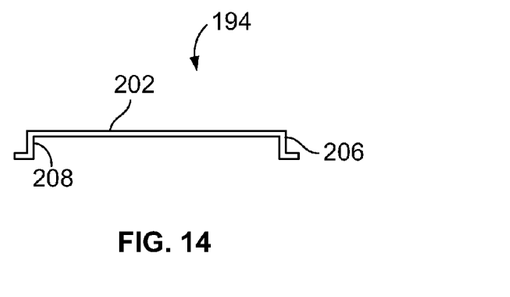
FIG. 14 is a side elevational view of the flat spring of FIG. 13.

The flat spring 194 is best shown in FIGS. 13 and 14. Each flat spring 194 includes an elongated planar main body 202 which has an elongated aperture 204 extending therethrough, a pair of legs 206, 208 extending perpendicularly from the main body 202 at the opposite ends thereof, a first pair of spaced apart retaining extensions 210a, 212a which extend perpendicularly outwardly from the leg 206, and a second pair of spaced apart retaining extensions 210b, 212b which extend perpendicularly outwardly from leg 208. Each retaining extension 210, 212 is parallel to the main body 202. Retaining extensions 210a, 210b extend through slots 178; retaining extensions 212a, 212b extend through slots 180. Each flat spring 193 can move upwardly and downwardly relative to the respective platform 154a, 154b within the slots 178, 180. On each crimping and cutting assembly 48, 50, the blade 156a, 156b aligns with the elongated aperture 204 in the flat spring 194 and the pair of coil springs 192 abut against the main body 202 of each flat spring 194. When the coil springs 192 are in their naturally expanded condition, the main body 202 is proximate to, or spaced slightly above the cutting edge 200 of the blade 156a, 156b. When the flat spring 194 is pressed upon, the coil springs 192 compress and the flat spring 194 moves toward the base 160 to expose the blade 156a, 156b.

Figure 10:
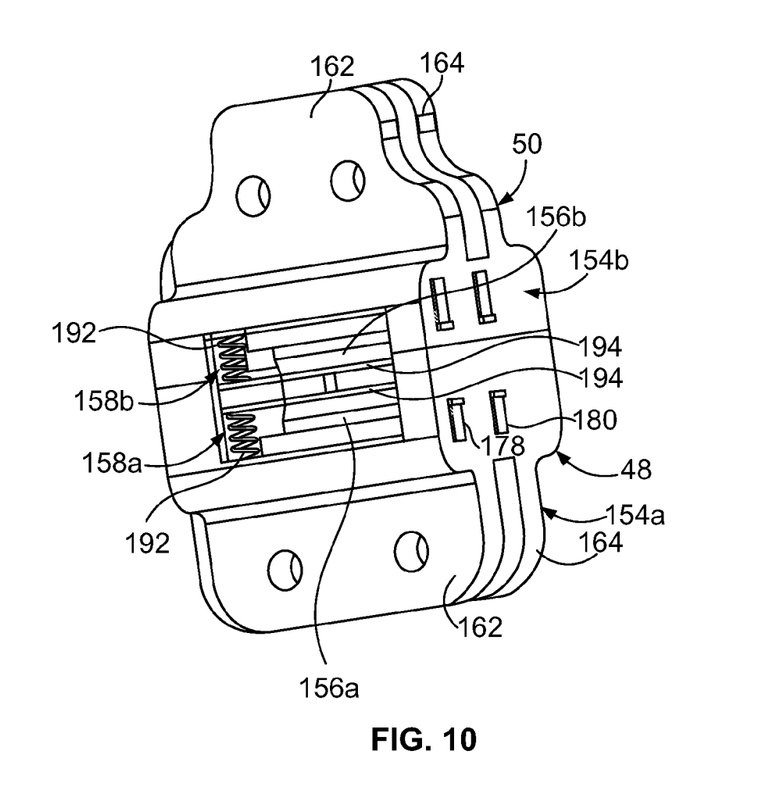
FIG. 10 is a perspective view of lower and upper crimping and cutting assemblies which form a component of the tool.

Platform 154a seats within the large rectangular recess 76 in the lower member 34 and the legs 162, 164 abut against both sides 66, 68 of the lower member 34. The blade 156a is parallel to the centerline A-A of the lower member 34. Suitable means, such as a pair of fasteners 114, are provided for attaching the legs 162, 164 to the lower member 34. Platform 154b seats within the large rectangular recess 102 in the upper member 36 and the legs 162, 164 abut against both sides 94, 96 of the upper member 36. The blade 156b is parallel to the centerline B-B of the upper member 36. Suitable means, such as a pair of fasteners 114, are provided for attaching the legs 162, 164 to the upper member 36. The blades 156a, 156b on the lower and upper crimping and cutting assemblies 48, 50 align with each other and the cutting edges 200 face each other.

Figure 15:
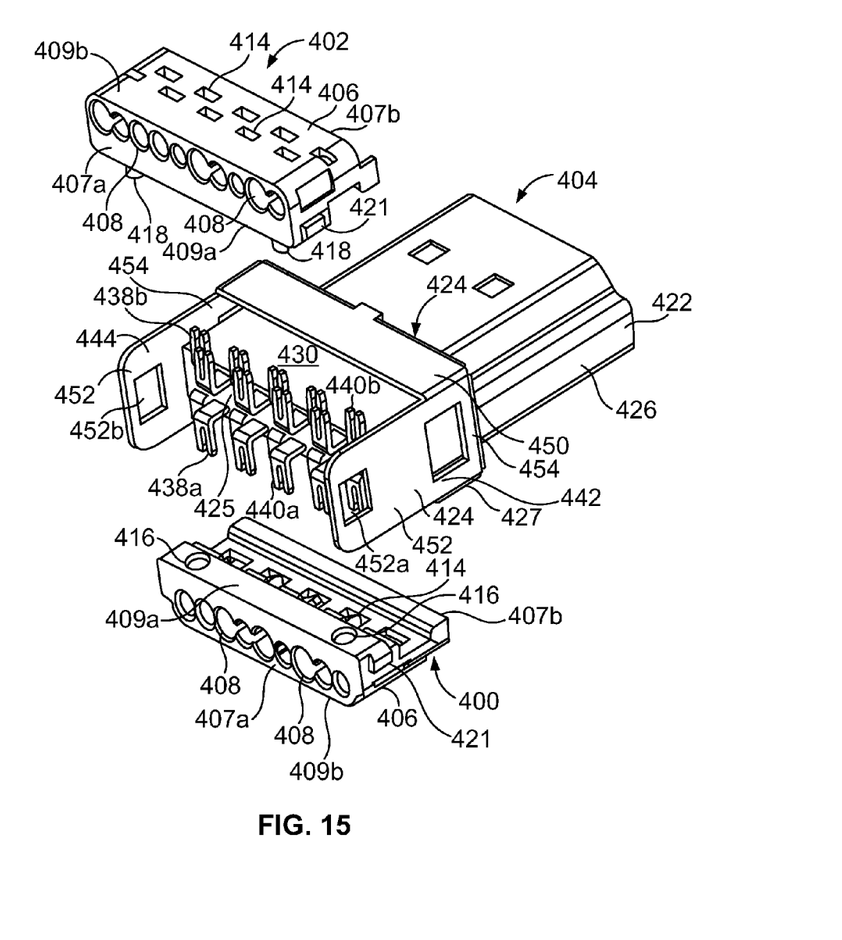
FIG. 15 is an exploded perspective view a terminal block and its associated wire guides which can be attached to the tool.
Figure 16:
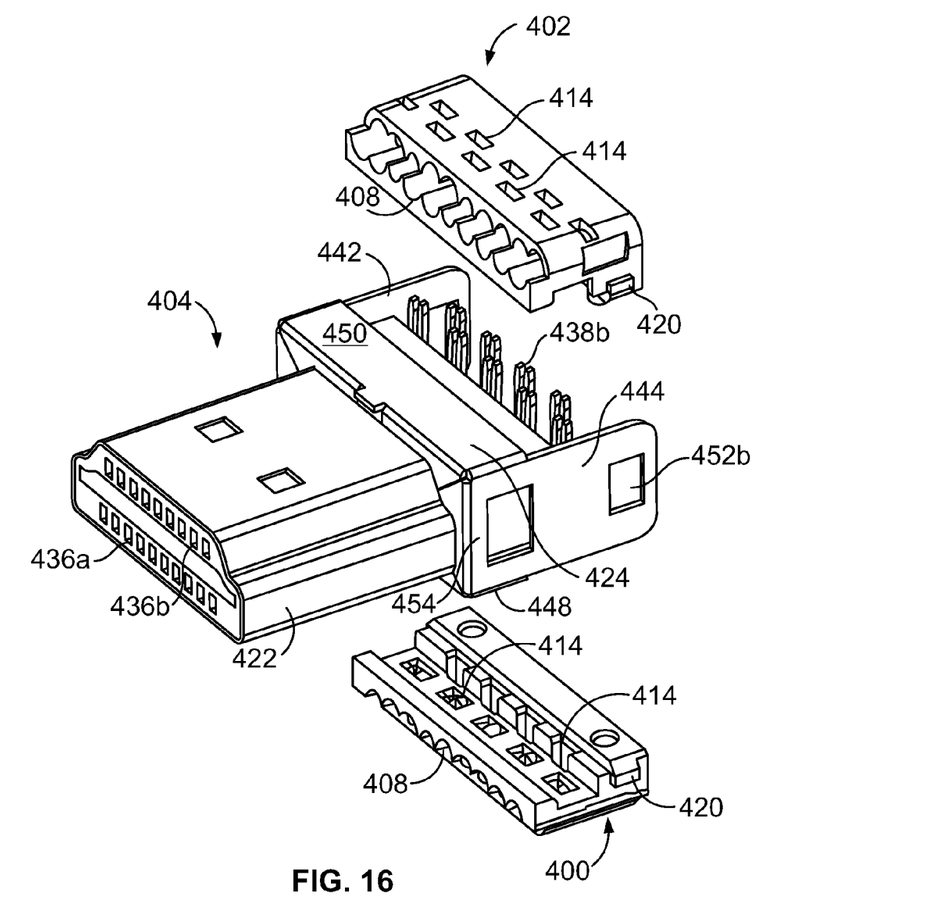
FIG. 16 is an alternate exploded perspective view the terminal block and its associated wire guides to that shown in FIG. 15.

FIGS. 15 and 16 show the wire guides 400, 402 and the terminal block 404 which are inserted into the lower and upper crimping and cutting assemblies 48, 50. FIGS. 15 and 16 do not show the wires 32 laced into the wire guides 400, 402.

Each wire guide 400, 402 has a housing 406 which is identically formed with the exceptions described herein. The housings 406 have opposite end faces 407a, 407b and a pair of surfaces 409a, 409b extending between the opposite end faces 407a, 407b. A plurality of passageways 408 extending from end face 407a to opposite end face 407b. A plurality of staggered passageways 414 extend between the surfaces 409a, 409b. Respective passageways 414 are in communication with respective passageways 408. The wire guides 400, 402 include suitable structure for mating the wire guides 400, 402 together, such as a pair of apertures 416 on one of the housings 406 which mate with a pair of pins 418 on the other of the housings 406. Each housing 406 includes a protrusion 420 (FIG. 16) on one side which mates with the terminal block 404 and a protrusion 421 (FIG. 15) on the opposite side which mates with the terminal block 404 as described herein.

The terminal block 404 has an insulative body 422, and a metal shield 424 extending around a portion of the body 422.

Figure 17:
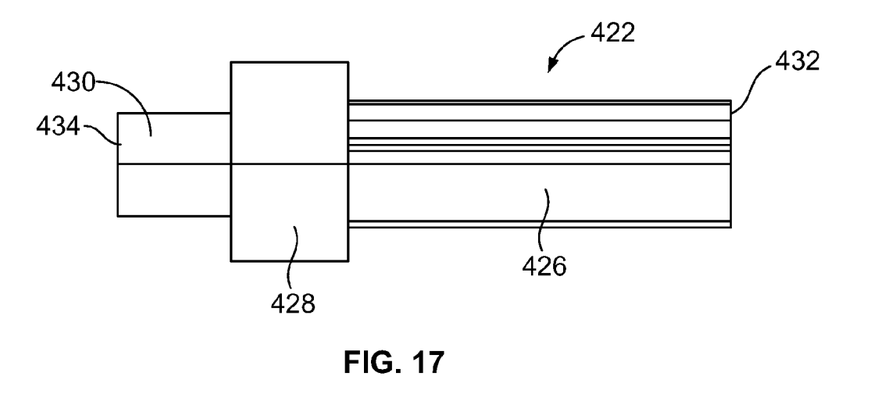
FIG. 17 is a side elevational view of a body which forms a component of the terminal block of FIGS. 15 and 16.

As best shown in FIG. 17, the body 422 includes a rearward section 426 which is generally rectangular, a central section 428 which is generally rectangular and extends from the rearward section 426, and a forward section 430 which is generally rectangular and extends from the central section 428. The central section 426 has an outer dimension which is larger than the rearward section 426 and the forward section 430 such that shoulders are formed between the central section 426 and the rearward section 426 and between the central section 426 and the forward section 430. A rearward end 432 of the body 422 is defined at the end of the rearward section 426, and a forward end 434 of the body 422 is defined at the end of the forward section 430. A lower row of spaced apart passageways 436a extend through the body 422 from the rear end 432 to the front end 434. An upper row of spaced apart passageways 436b extend through the body 422 from the rear end 432 to the front end 434. A conductor 438a is mounted in each passageway 436a in the lower row and extends outwardly from the end 434 of the body 422. Each conductor 438a is a right-angled conductor such that the free end 440a of each conductor 438a extends downwardly. The free ends 440a of the conductors 438a are split and are staggered apart from each other. A conductor 438b is mounted in each passageway 436b in the upper row and extends outwardly from the end 434 of the body 422. Each conductor 438b is a right-angled conductor such that the free end 440b of each conductor 438b extends upwardly. The free ends of the conductors 438b are split and are staggered apart from each other.

The shield 424 has side arms 442, 444, a lower wall 448 connecting the lower ends of the arms 442, 444 and an upper wall 450 connecting the upper ends of the arms 442, 444. A forward portion 452 of each arm 442, 444 extends outwardly from the walls 448, 450. The walls 448, 450 and a rearward portion 454 of the arms 442, 444 which is between the walls 448, 450 form a cavity which surrounds and is suitably secured to the central portion 428 of the body 422. An opening 452a, 452b is provided in the forward portion 452 of each arm 442, 444 and is provided proximate to the end thereof. The free ends 440a, 440b are positioned between the forward portions 452.

The tool 20 can be used to cut, strip and crimp the HDMI cable 24. Thereafter, the individual wires 32, as described herein, are mounted to the wire guides 400, 402 and attached to the terminal block 404 as described herein.

To cut the HDMI cable 24, the elongated section 71 and the cutting blade 40 are used. The tool 20 is opened (the handles 54, 82 are moved apart from each other) and the HDMI cable 24 is positioned between elongated section 71 of the lower member 34 and the cutting blade 40 on the upper member 36 such that the HDMI cable 24 is perpendicular to the centerlines A-A/B-B. The handles 54, 82 are then pressed together to the closed position so the HDMI cable 24 is completely severed by the cutting blade 40.

To strip the outer jacket 26 of the HDMI cable 24 from the remainder of the HDMI cable 24, the semi-circular recess 72 and the cutting blade 42 are used. The tool 20 is opened and the HDMI cable 24 is positioned in the semi-circular recess 72. The semi-circular recess 72 is sized such that the HDMI cable 24 substantially seats therewithin. The HDMI cable 24 is perpendicular to the centerlines A-A/B-B. The HDMI cable 24 extends upwardly from the upper edge of the semi-circular recess 72 (i.e. extends upwardly from the upper edge 70) a distance which is substantially equal to the thickness of the outer jacket 26. The handles 54, 82 are then pressed together so the outer jacket 26 is cut where the cutting blade 42 contacts the HDMI cable 24. The user rotates the tool 20 around the HDMI cable 24 to cut the outer jacket 26 around the circumference of the HDMI cable 24. Once cut around the circumference, the user can pull the tool 20 along the HDMI cable 24 to strip the cut portion of the outer jacket 26 from the remainder of the HDMI cable 24. Once the outer jacket 26 is removed, the user can release the pressure on the handles 54, 82 to cause the tool 20 to move to the open position (under the force of spring 124) and remove the stripped cable 24.

The exposed braided wire shield 28 and the foil 30 are easily pulled away from the remainder of the HDMI cable 24 and bent to enable the separated braided wire shield 28 and foil 30 to be severed from the remainder of the HDMI cable 24. The portion of the braided wire shield 28 and foil 30 which has been bent is severed from the remainder of the HDMI cable 24 by using the elongated section 71 of the lower member 34 and the cutting blade 40 on the upper member 36. The bent portion of the braided wire shield 28 and foil 30 is inserted between the elongated section 71 and the cutting blade 40 at the point where the cut is desired. The handles 54, 82 are then pressed together so the braided wire shield 28 and the foil 30 is completely severed from the remainder of the HDMI cable 24 using the cutting blade 40.

Once the outer jacket 26 is stripped from the remainder of the HDMI cable 24, the twisted pairs of wires 32 are untwisted by hand to generally straighten each wire 32. The foil shield 33 can be stripped from the untwisted pair of wires 32 by using the small rectangular recess 74 and the cutting blade 42. The tool 20 is opened and the untwisted pair of wires 32 is positioned in the small rectangular recess 74. The small rectangular recess 74 is sized such that the untwisted pair of wires 32 substantially seats therewithin. The untwisted pair of wires 32 is perpendicular to the centerlines A-A/B-B. The untwisted pair of wires 32 extends upwardly from the upper edge of the semi-circular recess 72 (i.e. extends upwardly from the upper edge 70) a distance which is substantially equal to the thickness of the foil shield 33. The handles 54, 82 are then pressed together so the foil shield 33 is cut where the cutting blade 42 contacts the untwisted pair of wires 32. In the completely closed position, the cutting blade 42 only cuts through the foil shield 33 and does not cut into the insulative covering 35 surrounding the conductors 37. Once cut, the user can pull the tool 20 along the untwisted pair of wires 32 to strip the cut portion of the foil shield 33 from the remainder of the untwisted pair of wires 32. Once the foil shield 33 is removed, the user can release the pressure on the handles 54, 82 to cause the tool 20 to move to the open position (under the force of spring 124) and remove the untwisted pair of wires 32.

The individual stripped wires 32 are laced into the individual passageways 408 of the wire guides 400, 402 such that the ends of the wires 32 extend outwardly from the ends 407b of the wire guides 400, 402. The laced wire guides 400, 402 are slid between the arms 442, 446 of the terminal block 404 and the protrusions 420, 421 engage within the apertures 434a, 434b. Opening 434a is larger than the combined protrusions 420 and opening 434b is larger than the combined protrusions 421 such that the wire guides 400, 402 can move upwardly and downwardly relative to the terminal block 404 and relative to each other. The end 407b of the wire guide 400 is proximate to, but spaced slightly from the wall 425 of the terminal block 404. The openings 434 constrain the wire guides 400, 402 from moving from side to side and end to end relative to the terminal block 404. The free ends of the conductors 438a, 438b seat between the wire guides 400, 402. The ends of the wires 32 (not shown) extend outwardly from the ends 407b of the wire guides 400, 402, over the shield 424 and may extend along the upper and lower surfaces of the body 422. The free ends of the conductors 438a align with the respective passageways 414. Once the laced wire guides 400, 402 are attached to the terminal block 404, the assembly is ready to be crimped and cut.

A description of the crimping and cutting cycle is now described. First, the handles 54, 82 are pulled apart from each other in order to separate the lower and upper crimping and cutting assemblies 48, 50. The terminal block 404 having the laced wire guides 400, 402 attached thereto is positioned on the lower crimping and cutting assembly 48 such that the lower wall 427 of the shield 424 seats on the terminal block mounts 188a and is positioned between the arms 168, 170, and the body 422 extends between the inner ends of the side walls 176. The C-shaped geometry of the walls 172, 174, 176 properly positions the terminal block 404 on the platform 154a and constrains the terminal block 404 relative to the platform 154a such that the terminal block 404 can only move upwardly and downwardly relative to the platform 154a. The arms 442, 446 and the rearward ends of the laced wire guides 400, 402 and the forward end of the wall 427 of the shield 424 seat on the flat spring 194 on the lower crimping and cutting assembly 48. The blade 156a is thus positioned proximate to the junction between the end 407b of the wire guide 400 and the front end of the lower wall 427 of the shield 424.

The handles 54, 82 are then pivoted toward each other. As the handles 54, 82 move toward each other, the flat spring 192 of the upper crimping and cutting assembly 50 engages against the upper surfaces of the wire guide 402 and the wall 450 of the shield. The blade 156b is thus positioned proximate to the junction between the end 407b of the wire guide 402 and the front end of the upper wall 450 of the shield 424. As the handles 54, 82 are moved further together, the flat spring 192 on the lower crimping and cutting assembly 48 moves downwardly until the blade 156a is exposed and the blade 156a cuts the wires 32 extending from the wire guide 400. In addition, as the handles 54, 82 are moved further together, the flat spring 192 on the upper crimping and cutting assembly 50 moves upwardly until the blade 156b is exposed and the blade 156b cuts the wires 32 extending from the wire guide 402. The push blocks 201a, 201b engage the opposite sides of the wire guides 400, 402 and push the wire guides 400, 402 toward the conductors 438a, 438b. The apertures 416 and the corresponding protrusions 418 on the wire guides 400, 402 mate with each other. Upon continued movement of the handles 54, 82 to the closed position, the free ends of the conductors 438a, 438b enter into the passageways 414 in the respective wire guides 400, 402. The free ends of the conductors 438b are split such that the wire 32 is between the split ends. As a result of the continued pushing against the push blocks 201a, 201b, the free ends of the conductors 438b pierce the insulation surrounding the wires 32 and mate the conductors 37 in the wires 32 with the conductors 438a, 438b to crimp the conductors 438a, 438b with the conductors 37. The protrusions 418 and apertures 416 form a friction fit to substantial prevent the wire guides 400, 402 from separating. Thereafter, the pressure on the handles 54, 82 is released and the spring 124 causes the handles 54, 82 to move apart from each other. As the handles 54, 82 move apart from each other, the flat spring 194 on the upper crimping and cutting assembly 50 moves downward under the force of the coil springs 192 to re-cover the cutting blade 156b and the flat spring 194 on the lower crimping and cutting assembly 48 moves upward under the force of the coil springs 192 to re-cover the cutting blade 156a. The cut portion of the wires 32 is removed.

As a result, the flat springs 192 aid in preventing a user from accidentally engaging the blades 194. Also, the structure of the tool 20 applies a simultaneous and uniform pressure to the top and bottom surfaces of the mated wire guides 400, 402 during crimping.

Thereafter, the crimped wire guides 400, 402 and terminal block 404 are removed from the lower and upper crimping and cutting assemblies 48, 50 and are ready to be placed into a suitable housing (not shown) for use in the field.

While the handles 54, 82 are described as moving radially relative to each other, the tool 20 can be designed such that the handles 54, 82 move linearly relative to each other. The geometry of the handles 54, 82 provides for a compact tool 20 which offers leverage to produce sufficient force to cause the conductors 438a, 438b to pass through the insulation 34 of the wires 32. The handles 54, 82 are linked together to synchronize the application of the compressive forces to the wire guides 400, 402.

While the blades 156a, 156b are shown as parallel to the centerlines A-A and B-B, it is to be understood that the tool 20 can be designed so that the blades 156a, 156b are perpendicular to the centerlines A-A and B-B.

While preferred embodiments of the present invention are shown and described, it is envisioned that those skilled in the art may devise various modifications of the present invention without departing from the spirit and scope of the appended claims.

The invention claimed is:

1. A tool comprising:
a lower member having a body and a handle at an end thereof, an upper member having a body and a handle at an end thereof, said lower and upper members being connected together such that said handles can be manipulated to open the tool to an open position or to close the tool to a closed position; and
a lower platform attached to said lower member, and an upper platform attached to said upper member, said platforms aligning with each other when said tool is in said closed position, each said platform including a base, a blade extending from said base and a pair of generally C-shaped walls extending from said base, each said blade having a cutting edge, said walls defining a cavity in each said platform for holding an associated laced wire guide and mated terminal block therein, and said blade positioned within said cavity.

2. A tool as defined in claim 1, further including a spring assembly provided on each said platform which aligns with said cutting edge of said blade on said platform.

3. A tool as defined in claim 2, wherein each said spring assembly includes a flat spring having ends mounted in slots provided in said walls of said respective platform, said flat spring being capable of moving relative to said respective platform, said flat spring having a slot therein which aligns with said cutting edge of said blade provided on the respective platform, and a pair of springs provided between said flat spring and said respective base for biasing said flat spring upwardly and downwardly relative to said respective platform to expose or cover said cutting edge of said blade provided thereon.

4. A tool as defined in claim 3, further including a push block extending from each said base for engaging the laced wire guides, said push block provided proximate to said respective blade.

5. A tool as defined in claim 1, further including a third cutting blade, said third cutting blade being attached to said upper member, said third cutting blade being spaced from said upper platform.

6. A tool as defined in claim 5, said lower member has a planar edge proximate to said fourth cutting blade when said tool is a closed position.

7. A tool as defined in claim 5, wherein said lower member has a semi-circular recess proximate to said third cutting blade when said tool is a closed position.

8. A tool as defined in claim 7, further including a fourth cutting blade, said fourth cutting blade being attached to said upper member, said fourth cutting blade being spaced from said third cutting blade and spaced from said upper platform, said lower member has a planar edge proximate to said fourth cutting blade when said tool is a closed position.

9. A tool as defined in claim 5, wherein said lower member has a generally rectangular recess proximate to said third cutting blade when said tool is a closed position.

10. A tool as defined in claim 9, further including a fourth cutting blade, said fourth cutting blade being attached to said upper member, said fourth cutting blade being spaced from said third cutting blade and spaced from said upper platform, said lower member has a planar edge proximate to said fourth cutting blade when said tool is a closed position.

11. A tool as defined in claim 5, wherein said lower member has a semi-circular recess and a generally rectangular recess proximate to said third cutting blade when said tool is a closed position.

12. A tool as defined in claim 11, further including a fourth cutting blade, said fourth cutting blade being attached to said upper member, said fourth cutting blade being spaced from said third cutting blade and spaced from said upper platform, said lower member has a planar edge proximate to said fourth cutting blade when said tool is a closed position.

13. A tool comprising:
a lower member having a body and a handle at an end thereof, an upper member having a body and a handle at an end thereof, said lower and upper members being connected together such that said handles can be manipulated to open the tool to an open position or to close the tool to a closed position; and a lower platform attached to said lower member, and an upper platform attached to said upper member, said platforms aligning with each other when said tool is in said closed position each said platform including a base and a blade extending from said base, each said blade having a cutting edge, said platforms holding an associated laced wire guide and mated terminal block therein;
a spring assembly provided on each said platform which aligns with said cutting edge of said blade on said platform, each said spring assembly including a flat spring attached to said respective platform and moveable relative thereto, said flat spring having a slot therein which aligns with said cutting edge of said blade provided on the respective platform, and a pair of springs provided between said flat spring and said respective base for biasing said flat spring upwardly and downwardly relative to said respective platform to expose or cover said cutting edge of said blade provided thereon.

14. A tool as defined in claim 13, wherein said each said platform has upright walls extending from said base, said upright walls having slots provided therein, said flat spring having opposite ends which are slidably mounted in said slots.

15. A tool as defined in claim 14, wherein said walls on each said platform are generally C-shaped.

16. A tool as defined in claim 13, further including a push block extending from each said base for engaging the laced wire guides, said push block provided proximate to said respective blade.

17. A tool as defined in claim 13, further comprising:
first and second cutting blades attached to said upper member, each said first and second cutting blade having a cutting edge, said first and second cutting blades being spaced apart from each other;
said lower member having a planar edge proximate to said first cutting blade when said tool is a closed position; and
said lower member having a semi-circular recess and a generally rectangular recess proximate to said second cutting blade when said tool is a closed position, said semi-circular recess and said generally rectangular recess being spaced apart from each other.

18. A tool as defined in claim 17, wherein each said cutting edge extends axially along said upper member.

19. A tool as defined in claim 18, wherein when said tool in said closed position, each said cutting edge falls along a centerline of said lower member.

20. A tool comprising:
a lower member having a body and a handle at an end thereof, an upper member having a body and a handle at an end thereof, said lower and upper members being connected together such that said handles can be manipulated to open the tool to an open position or to close the tool to a closed position;
a lower platform attached to said lower member, and an upper platform attached to said upper member, said platforms aligning with each other when said tool is in said closed position, each said platform including a base, a blade and upright walls extending from said base, each said blade having a cutting edge, said upright walls defining a cavity in each said platform for holding an associated laced wire guide and mated terminal block therein; and
a spring assembly provided on each said platform which aligns with said cutting edge of said blade on said platform.

* * * * *